United States Patent [19]
Holtan et al.

[11] Patent Number: 6,142,457
[45] Date of Patent: Nov. 7, 2000

[54] ATOMIZING FEED NOZZLE

[75] Inventors: Timothy Paul Holtan, Port Melbourne, Australia; Gregory Patrick Muldowney, Glen Mills, Pa.

[73] Assignee: Mobil Oil Corporation, Fairfax, Va.

[21] Appl. No.: 09/016,627

[22] Filed: Jan. 30, 1998

(Under 37 CFR 1.47)

[51] Int. Cl.[7] ..................................... B01F 3/04
[52] U.S. Cl. ........................................... 261/78.2
[58] Field of Search .............................. 261/76, 77, 78.1, 261/78.2

[56] References Cited

U.S. PATENT DOCUMENTS

| | | | |
|---|---|---|---|
| 2,883,167 | 4/1959 | Krantz | 261/78.2 |
| 2,953,306 | 9/1960 | Dijkstra | 261/78.2 |
| 3,206,393 | 9/1965 | Pohlenz | 208/164 |
| 3,261,777 | 7/1966 | Iscol et al. | 208/113 |
| 3,774,846 | 11/1973 | Schurig et al. | 261/78.2 |
| 4,116,387 | 9/1978 | Kremer, Jr. et al. | 261/78.2 |
| 4,251,033 | 2/1981 | Rich et al. | 261/78.2 |
| 4,601,814 | 7/1986 | Mauleon et al. | 208/113 |
| 4,640,463 | 2/1987 | Krambeck et al. | 239/424 |
| 4,650,566 | 3/1987 | Buyan et al. | 208/153 |
| 5,017,343 | 5/1991 | Cetinkaya | 422/140 |
| 5,054,423 | 10/1991 | Escobal | 261/77 |
| 5,139,748 | 8/1992 | Lomas et al. | 422/140 |
| 5,174,889 | 12/1992 | Nielsen | 208/113 |
| 5,232,164 | 8/1993 | Resch et al. | 261/78.2 |
| 5,289,976 | 3/1994 | Dou et al. | 239/431 |
| 5,306,418 | 4/1994 | Dou et al. | 208/157 |
| 5,322,618 | 6/1994 | Raterman | 208/113 |
| 5,328,591 | 7/1994 | Raterman | 208/113 |
| 6,012,652 | 1/2000 | Holtan et al. | 239/430 |

FOREIGN PATENT DOCUMENTS

| 652409 | 3/1979 | U.S.S.R. | 261/78.2 |
|---|---|---|---|

OTHER PUBLICATIONS

Lefebvre, A.H., "Airblast Atomization", *Prog. Energy Combust. Sci.*, 1980, 6, 233–261.

*Primary Examiner*—C. Scott Bushey
*Attorney, Agent, or Firm*—Paul E. Purwin

[57] ABSTRACT

A nozzle and method of use thereof is provided for atomizing a liquid stream. The nozzle is particularly useful for atomizing a hydrocarbon feed into a catalytic cracking zone of a fluidized catalytic cracking (FCC) process. The nozzle includes a primary conduit for receiving a liquid stream and a secondary conduit for receiving a dispersion medium. At least a portion of the secondary conduit is positioned within the primary conduit to form a passageway for the liquid stream between the inner surface of the primary conduit and outer surface of secondary conduit. The dispersion medium and liquid stream are combined in a mixing zone that is located between the outlet of the secondary conduit and the outlet of the primary conduit. In the mixing zone, the primary conduit inner surface is gradually tapered so the cross-sectional area of the primary conduit outlet is decreased relative to the cross-sectional area of the primary conduit inlet. The primary conduit outlet has lip that is useful for shearing or severing the liquid stream as it exits the primary conduit.

10 Claims, 5 Drawing Sheets

ATOMIZING FEED NOZZLE

FIELD OF THE INVENTION

This invention relates to an apparatus and method of use thereof for atomizing a liquid stream. More particularly, this invention relates to a nozzle and method of using the nozzle to atomize a liquid stream in the presence of a dispersion medium to produce a spray of fine liquid droplets. The apparatus and method of the present invention is particularly useful for atomizing a stream containing a hydrocarbon liquid into the catalytic conversion zone of a fluid catalytic cracking unit.

BACKGROUND OF THE INVENTION

Fluid catalytic cracking (FCC) of petroleum fractions is a well-established refinery operation. In FCC, heavy hydrocarbon fractions (greater than about 20 to about 30 carbon atoms in length) are chemically broken down into lighter hydrocarbon fractions (less than about 12 to about 15 carbons in length), such as gasoline. The FCC unit usually comprises a reactor section connected to a regenerator section by standpipes. The catalyst itself is a finely divided solid and behaves like a fluid in the reactor, regenerator, and connecting standpipes, hence the designation "fluid" catalyst.

In the operation of the FCC process, fresh hydrocarbon feed, which may be preheated, is mixed with catalyst and undergoes cracking within the catalytic conversion zone of the reactor section. The catalytic conversion zone, in modern FCC units, is primarily located in the riser of the reactor section. For catalytic cracking to occur, the hydrocarbon feed (e.g., oil), must be vaporized to permit the hydrocarbon feed to diffuse into the pores of the catalyst (generally a zeolite) to the cracking sites.

The catalytic cracking reaction results in coke being deposited onto the catalyst to form "coked" or "spent" catalyst. Products exit the reactor in the vapor phase and pass to at least one main fractionator or distillation column for separation into desired fractions. The spent catalyst passes continuously from the reactor to the regenerator via a spent catalyst standpipe. In the regenerator, the coke is converted in an exothermic reaction to gaseous products by contact with an oxygen-containing gas. The flue gas passes out of the regenerator through various heat recovery means, and the hot regenerated catalyst is recirculated to the reactor via a return catalyst standpipe where it is again picked up by fresh hydrocarbon feed. Typically, heat released in the regenerator is carried to the reactor by the hot regenerated catalyst to supply heat for the endothermic cracking reactions. Typical fluid catalyst cracking systems are disclosed in U.S. Pat. Nos. 3,206,393 to Pohlenz and 3,261,777 to Iscol, et al., which are hereby incorporated by reference in their entireties.

Nozzles are used to inject the hydrocarbon feed, typically in the form of a liquid spray, into the catalytic conversion zone of the riser. To form a spray, typically, the hydrocarbon feed is combined with a dispersion medium, such as steam, to form a dispersed hydrocarbon stream. The one or more nozzles used to inject the dispersed hydrocarbon stream into the catalytic conversion zone may be axially or radially disposed. With axial nozzles, coverage is achieved by using one or more nozzles that extend into the riser section of an FCC reactor and terminate at a set of points within the riser cross sectional area. The axial nozzles are preferably oriented substantially vertical (preferably within about 10° of the vertical axis of the riser) to create a flow of hydrocarbon feed that is preferably parallel to the upflowing catalyst. With radial nozzles, coverage is achieved by using a plurality of nozzles that are mounted around the perimeter of the riser wall. Preferably, the radial nozzles extend minimally into the riser itself. This orientation of the nozzles creates a flow of hydrocarbon feed that crosses with the upward flow of catalyst. Radial nozzles are preferably oriented with respect to the vertical axis of the riser at any angle from about 10° pointing upward to about 90°horizontal). To provide optimal catalytic cracking conditions, one or more nozzles in either orientation preferably collectively spray the dispersed hydrocarbon stream in a pattern that expands to cover the entire cross-sectional area through which the cracking catalyst is flowing. Improved coverage provides better catalyst-hydrocarbon feed mixing which enhances catalytic cracking reactions and minimizes thermal cracking reactions. Thermal cracking reactions produce undesirable products such as methane and ethane and decreased yields of more valuable FCC products.

In addition to full spray coverage, the nozzles preferably produce fine hydrocarbon feed droplets, preferably less than about 100 microns ($\mu$m) in Sauter mean diameter (i.e., the diameter of a sphere having the same volume to surface area ratio as the measured droplets), as this is comparable to the size of individual catalyst particles. As droplet size decreases, the ratio of hydrocarbon feed drop surface area to volume increases, which accelerates heat transfer from the catalyst to the hydrocarbon feed and shortens hydrocarbon feed vaporization time. Quicker vaporization improves yield of catalytic cracking reaction products since the hydrocarbon feed as a vapor is able to diffuse into the pores of the catalyst. Conversely, any delay in hydrocarbon feed vaporization, and mixing of the hydrocarbon feed and catalyst, leads to increased yields of thermal cracking products and coke.

A variety of nozzles have been used for providing an atomized hydrocarbon stream into the catalytic cracking zone. FIG. 1 illustrates a prior art nozzle 1 having a bayonet 2 and a simple orifice tip 3. In this type of nozzle the hydrocarbon feed and dispersion medium are mixed upstream of the bayonet to form a dispersed hydrocarbon stream 4 that flows through the orifice 5. The orifice tip 3 is a plate positioned approximately two inches upstream from the bayonet outlet 6 with the diameter of the orifice 5 being smaller than the nozzle inner diameter 7. The orifice 5 provides a shear edge to break up the liquid and to spread the spray more widely across the reaction zone.

U.S. Pat. No. 4,640,463 to Krambeck et al. (hereinafter referred to as "Krambeck") discloses another type of nozzle useful for injecting a liquid hydrocarbon feed and dispersion gas into a catalytic cracking zone. The Krambeck nozzle is an example of a class of nozzles known as plain-jet atomizers. In plain-jet atomizers, liquid and gas are discharged together through a high-shear restriction. The Krambeck nozzle contains an inner conduit capped with a flow restriction device that is concentrically aligned with an outer conduit also capped with a flow restriction device. The nozzle operates by introducing hydrocarbon feed in the inner conduit and a dispersion gas such as steam in an annular space between the inner and outer conduits. The outer conduit extends longitudinally beyond the inner conduit so that mixing of the hydrocarbon feed and steam can occur between where the inner and outer conduits end. The dispersed hydrocarbon stream is atomized into the catalytic conversion zone through a flow restriction device located at the end of the outer conduit.

Another class of nozzles, known as "prefilming" nozzles, operate by producing a thin sheet of liquid that is contacted with a high-velocity gas, in one or more locations around the perimeter of the liquid sheet, in a space free of minute flow restrictions. The high velocity gas destabilizes the liquid sheet and breaks it into liquid droplets. Examples of this type of nozzle are disclosed in, for example, "Airblast Atomization" by Arthur H. Lefebvre, *Prog. Energy Combust. Sci.*, Vol. 6, pages 233–261, (1980). Most prefilming nozzles require gas-to-liquid mass ratios of at least 2.0, and preferably 4.0, for effective atomization. In typical FCC units, the practical maximum of gas-to-liquid mass ratio is lower; preferably less than 0.10, and more preferably from about 0.03 to about 0.05.

In order to provide finer droplets with a fixed gas-to-liquid ratio, a plain-jet atomizer requires a smaller diameter orifice and a prefilming nozzle requires a thinner opening for the liquid film. However, smaller openings generally lead to greater feed-side pressure drop. With present-day refinery economics dictating that FCC units operate at feed rates far exceeding design, feed-side pressure drop is typically a very scarce resource. Often feed-side pressure drop constrains incremental throughput, thereby limiting profitability. In order to increase feed rate with minimal pressure drop penalty, some FCC practitioners tolerate as feed nozzles simple straight pipes with no tip device, and are thus unable to obtain the yield benefits of smaller drop size and better riser coverage. Other refiners turn down dispersion steam to make room for more hydrocarbon feed, which decreases pressure drop by reducing not only steam flow but also the amount of hydrocarbon feed which vaporizes, the latter being a larger impact. Unfortunately steam reduction also compromises both atomization and spray coverage because nozzle velocity decreases and the energy available to shear the hydrocarbon feed is smaller.

It is desirable to provide a nozzle for atomizing liquid in the presence of a dispersion medium that does not require a significant feed side pressure at a given feed rate and nozzle diameter to produce fine liquid droplets.

SUMMARY OF THE INVENTION

In one embodiment of the present invention a nozzle is provided for atomizing a liquid. The nozzle comprises (a) a primary conduit having a longitudinal axis, an inner surface, an inlet for receiving a liquid stream, and an outlet; (b) a secondary conduit, a portion of which is positioned within the primary conduit for receiving a dispersion medium, having a longitudinal axis, an outer surface, an inlet, and an outlet that is located within the primary conduit at a point upstream from the outlet of the primary conduit; (c) at least one fluid passageway between the outer surface of the secondary conduit and the inner surface of the primary conduit; and (d) a mixing zone, located between the secondary conduit outlet and the primary conduit outlet, wherein the inner surface of the primary conduit within the mixing zone is a tapered surface that reduces the cross sectional area of the primary conduit in the mixing zone.

In another embodiment of the present invention, a process is provided for atomizing a liquid stream. The process includes (a) providing a nozzle of the present invention; (b) feeding a liquid stream through the principal conduit inlet and through the passageway between the principal conduit and secondary conduit; (c) feeding a dispersion medium through the secondary conduit inlet; and (d) joining the liquid stream and the dispersion medium at the secondary conduit outlet to form a prefilmed liquid stream and directing the prefilmed liquid stream through the mixing zone and through the primary conduit outlet to form an atomized liquid of fine droplets.

The nozzle of the present invention is particularly useful for feeding a liquid stream containing a hydrocarbon feed into the catalytic conversion zone of a fluid catalytic cracking unit. When the nozzle is used for atomizing a hydrocarbon feed into the catalytic conversion zone, preferably more than one axially or radially mounted nozzle is used.

DESCRIPTION OF THE PREFERRED EMBODIMENTS

The present invention provides a nozzle that, when operated under the proper conditions, produces a spray of fine liquid droplets. The nozzle is designed to feed a liquid hydrocarbon stream into the catalytic conversion zone of a fluid catalytic cracking unit.

The nozzle of the present invention is designed to produce a spray of fine liquid droplets having a Sauter mean diameter (SMD) of less than about 300 microns ($\mu$m), more preferably less than about 200 $\mu$m, and most preferably less than about 100 $\mu$m. Another feature of the nozzle of the present invention is that it can, if desired, be operated at a relatively low pressure drop. By "pressure drop", it is meant the difference between the pressure of the fluid entering the liquid conduit of the nozzle (i.e., "feed-side pressure") and the pressure of the medium into which the nozzle discharges. By "low" pressure drop, it is meant a pressure drop three to five times lower than that of alternative plain-jet or prefilming atomizer nozzles. For example, the nozzle of the present invention is capable of operating under a pressure drop of 10 pounds per square inch (psi) to 15 psi to produce a spray having a 200 micron average droplet size when atomizing 15,000 barrels per day of hydrocarbon feed using dispersion steam in the amount of 2.0 weight percent based on the weight of the feed.

The nozzle of the present invention includes a primary conduit for receiving a liquid stream and a secondary conduit for receiving a stream of dispersing medium. A "liquid stream", as used herein, is a fluid stream containing a liquid, such as a hydrocarbon feed, that is to be atomized. A "dispersing medium", as used herein, is a fluid, typically a gas-containing fluid, such as steam, that is used to enhance the atomization of the liquid.

Figure 1:
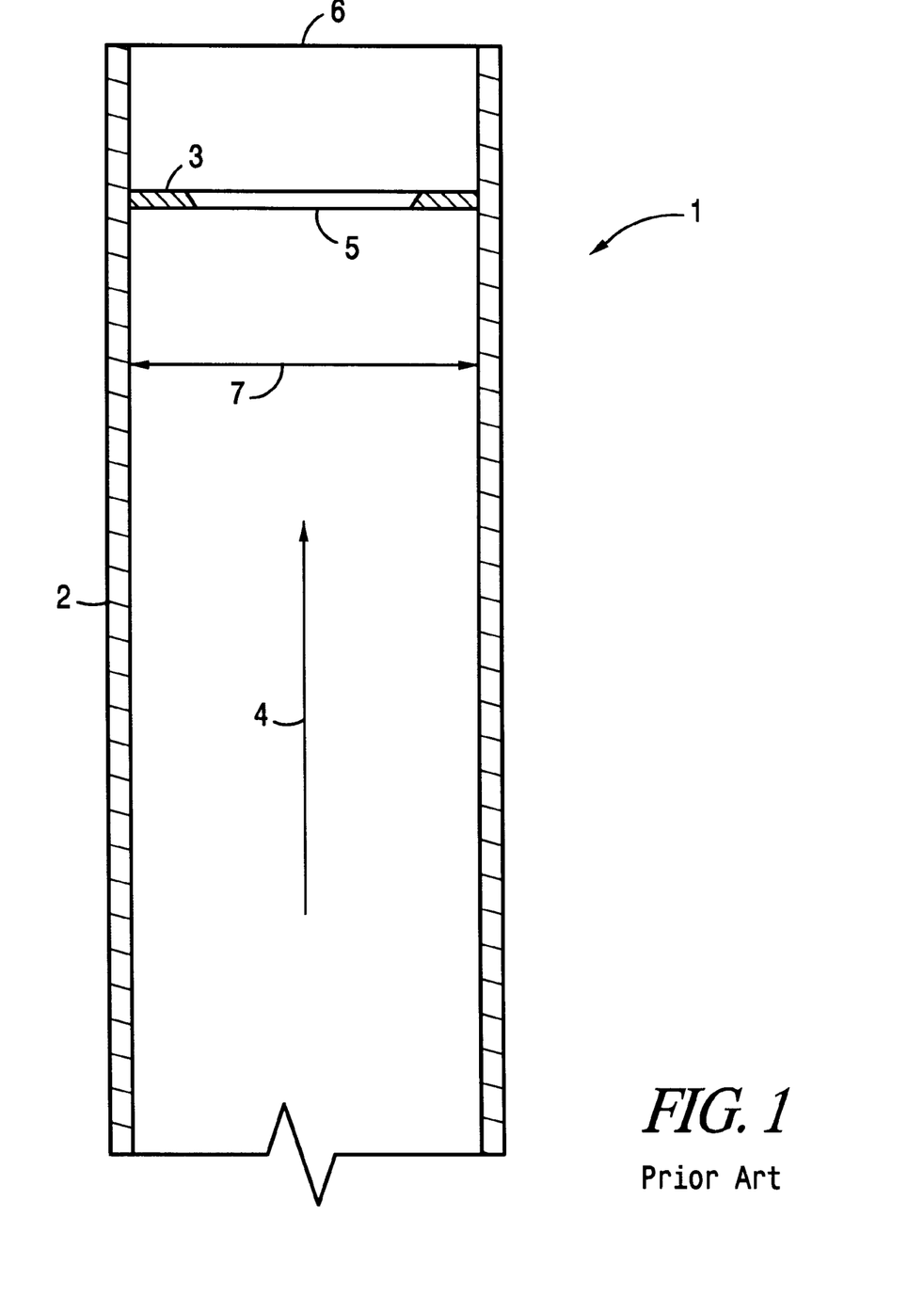
FIG. 1 (prior art) shows a nozzle having a bayonet fitted with an orifice tip.
Figure 2:
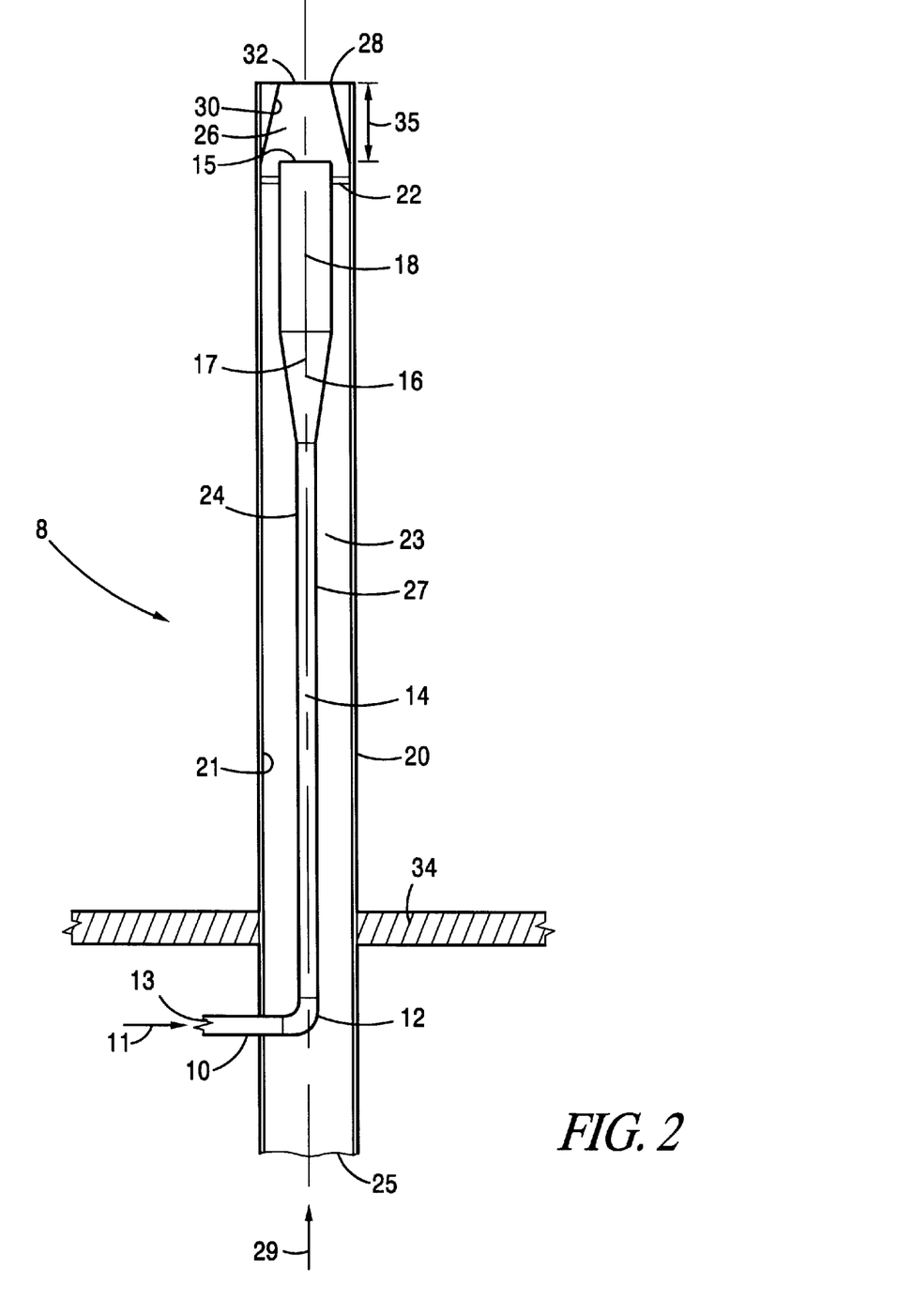
FIG. 2 shows an embodiment of an atomizing nozzle of the present invention based on concentric cylindrical conduits.

Referring to the Figures where like numbers refer to like elements, FIG. 2 shows a preferred, but not limiting, embodiment of an atomizing nozzle 8 of the present invention having cylindrically shaped conduits. The nozzle 8 includes a primary conduit 20 for receiving a liquid stream 29 and a secondary conduit 24 for receiving a dispersing medium stream 11. The primary conduit 20 has a longitudinal axis 17, an inlet 25 and an outlet 32. The secondary conduit 24 has an inlet 13, an outlet 15, and a longitudinal axis (not shown) that is coaligned with the longitudinal axis 17 of the primary conduit 20. At least a portion of the secondary conduit 24 is positioned within the primary conduit 20 to form at least one annular passageway 23 between an outer surface 27 of the secondary conduit 24 and an inner surface 21 of the primary conduit 20 for the liquid stream 29.

The secondary conduit 24 can optionally include several sections as shown in FIG. 2. The secondary conduit 24 has the following sections, joined in the order listed: an inlet pipe 10, an inlet elbow 12, a first longitudinal tube section 14, a conically flared union 16 to increase the cross sectional area of the secondary conduit 24, and a second longitudinal tube section 18. The secondary conduit 24 as shown in FIG. 2 is preferably retained concentrically within the primary conduit 20 by one or more stays 22 (only two shown). The secondary conduit outlet 15 is located upstream of the primary conduit outlet 32 to form a mixing zone 26 beginning at the secondary conduit outlet 15 and ending at the primary conduit outlet 32.

In the mixing zone 26, the liquid stream 29 is joined with the dispersion medium stream 11 in a manner to force the liquid stream into the general shape of a thin film that surrounds the dispersion medium. This combined stream containing the liquid stream and dispersion medium is referred to hereinafter as a "prefilmed liquid stream." As shown in FIG. 2, in the mixing zone 26, the inner surface 30 of the primary conduit 20 is tapered and is frustoconical in shape. This tapered inner surface 30 serves to gradually reduce the inside cross sectional area of the primary conduit 20 along a length 35 of the mixing zone 26. Part of the primary conduit outlet 32 is a circular lip 28 that is preferably razor sharp for shearing the liquid into ligaments. The complete nozzle assembly can be mounted, for example, through a header 34 or flange wall (not shown).

Figure 3:
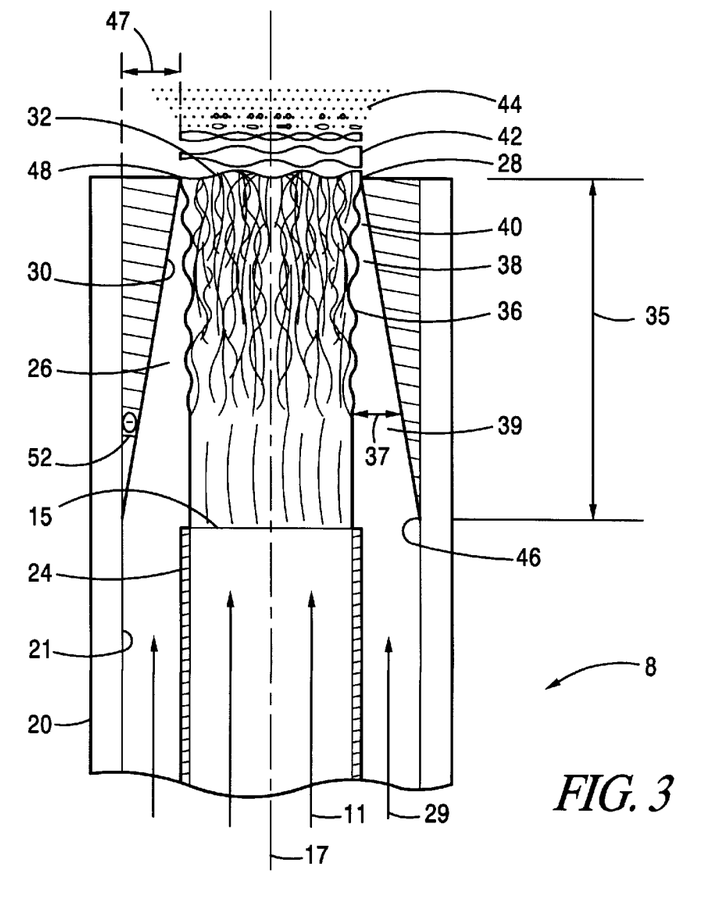
FIG. 3 shows the outlet of the nozzle of FIG. 2 in greater detail.

FIG. 3 shows an enlargement of the upper section of the nozzle 8 in FIG. 2 to show the fluid mechanical process by which the liquid stream 29 is atomized. Over the length 35 of the mixing zone 26, the tapered inner surface 30 of the primary conduit 20 serves to gradually reduce the thickness 37 of the liquid stream to form a thin liquid film 39. The degree of taper is shown by an angle θ 52 formed between the inner surface 21 of the primary conduit and the tapered inner surface 30. As the liquid film 39 continues to travel along the conically tapered inner surface 30, ripples along the dispersion medium-liquid interface 36 are formed that lead to alternating thicker bands 38 and thinner bands 40 of liquid film 39. The rippling of the interface 36 is produced by designing the nozzle 8 so that the velocity of the dispersion medium exceeds the velocity of the liquid stream at the secondary conduit outlet 15. As the liquid film 39 passes through the primary conduit outlet 32, the circular lip 28 cuts or shears the liquid film 39 at the thinner bands 40 to form ring ligaments 42. The ring ligaments 42 are discharged from primary conduit outlet 32 while encircling the dispersion medium 11. The expansion of the dispersion medium 11 in passing through the outlet 32 breaks or shatters the ring ligaments 42 into liquid droplets 44.

Figure 3A:
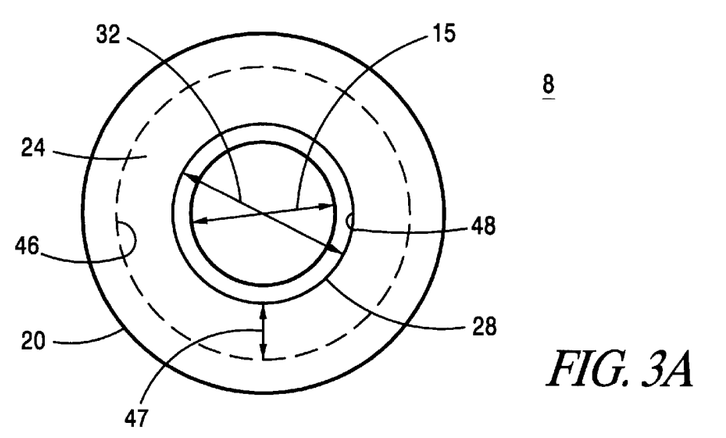
FIG. 3A shows a top view of the nozzle in FIG. 2.

FIG. 3A shows a top view of the upper section of the nozzle 8 in FIG. 3. In FIG. 3A, the secondary conduit outlet 15 is concentrically aligned with the primary conduit outlet 32. The secondary conduit outlet 15 is located within the primary conduit 20 a distance equal to the length 35 of the mixing zone as measured from the primary conduit outlet 32 to the secondary conduit outlet 15. FIG. 3A also shows that the cross sectional area of the primary conduit decreases over the length of the mixing zone by a radial distance 47. The radial distance 47 is between the inner surface 46 of the primary conduit 20 at the secondary conduit outlet 15 and the inner surface 48 at the primary conduit outlet 32 corresponding to the atomizing lip 28.

In addition to forming the nozzle with cylindrically shaped conduits, other geometrically shaped conduits may be used. For example, rectangular, elliptical, or polygonal shaped geometries may be used. The choice of the shape of the conduits can be chosen to achieve different shaped sprays. For example, a cylindrically shaped primary conduit will result in a circular shaped spray; and a rectangular shaped primary conduit will result in a flat shaped spray.

Figure 4:
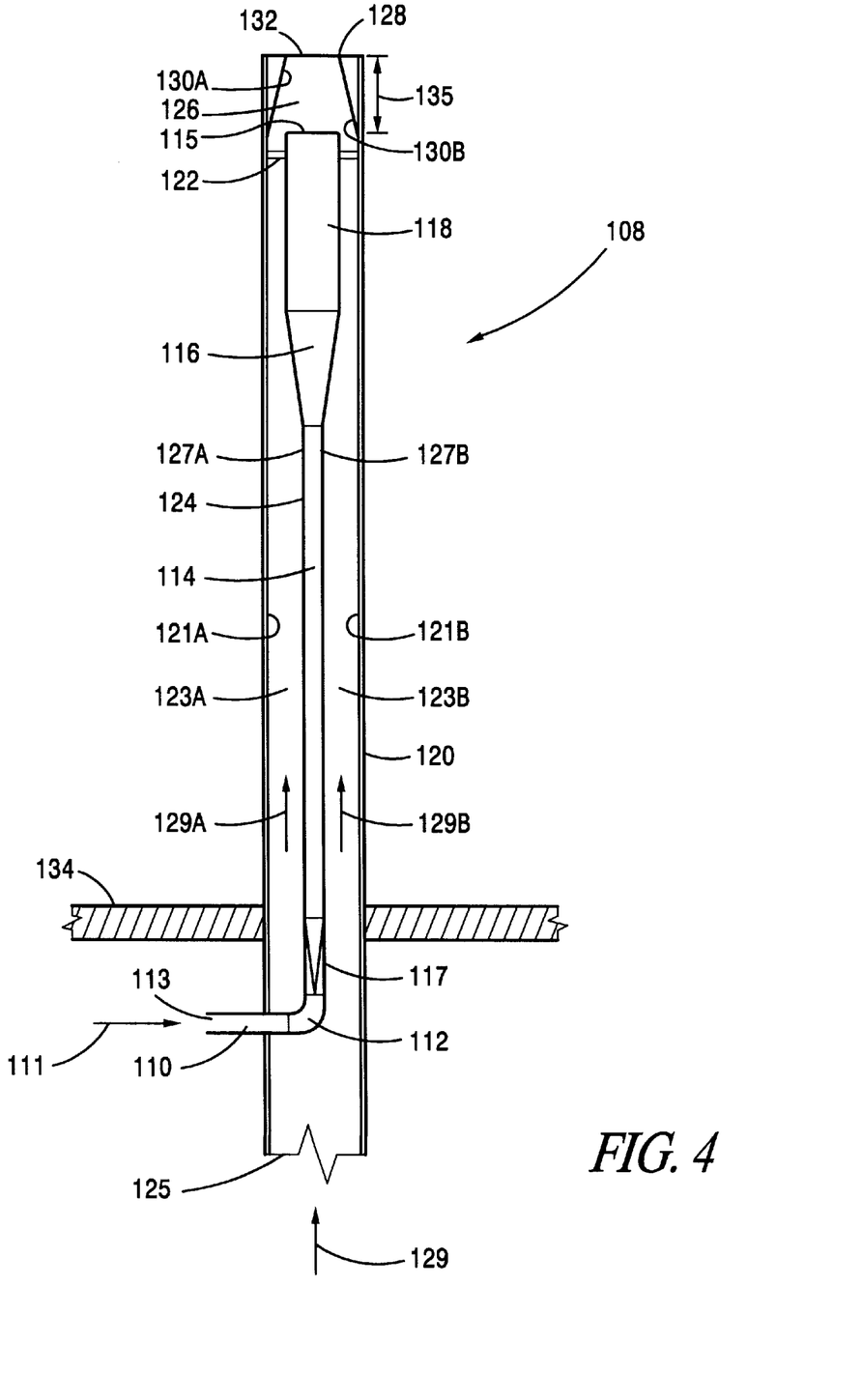
FIG. 4 shows another embodiment of an atomizing nozzle of the present invention based on coaxial rectangular conduits.

FIG. 4 shows another embodiment of an atomizing nozzle 108 of the present invention having rectangular shaped conduits. The nozzle 108 includes a primary conduit 120 for receiving a liquid stream 129 and a secondary conduit 124 for receiving a dispersing medium stream 111. The primary conduit 120 has an inlet 125 and an outlet 132, and the secondary conduit 124 has an inlet 113 and an outlet 115. At least a portion of the secondary conduit 124 is positioned within the primary conduit 120 to form two rectangular shaped passageways 123A and 123B, located between outer surfaces 127A and 127B of the secondary conduit 124 and inner surfaces 121A and 121B of the primary conduit 120. These two passageways 123A and 123B divide the liquid stream 129 into two liquid streams 129A and 129B. Similar to the nozzle in FIG. 2, the secondary conduit 124 can optionally include several sections. The secondary conduit 124 in FIG. 4 has the following sections, joined in the order listed: an inlet pipe 110, an inlet elbow 112, a transition section 117 to convert the round cross-section of inlet elbow 112 to the rectangular cross-section of the downstream sections, a first rectangular duct section 114, a rectangular flared union 116 to increase the cross sectional area of the secondary conduit 124, and a second rectangular duct section 118. The secondary conduit 124 as shown in FIG. 4 is preferably retained coaxially within the primary conduit 120 by one or more stays 122 (only two shown). The secondary conduit outlet 115 is located upstream of the primary conduit outlet 132 to form a mixing zone 126 beginning at the secondary conduit outlet 115 and ending at the primary conduit outlet 132.

In the mixing zone, the liquid streams 129A and 129B are joined with the dispersion medium stream 111 to form a prefilmed liquid stream where the dispersion medium stream keeps the two liquid streams 129A and 129B separate. As shown in FIG. 4, the inner surfaces 121A and 121B of the primary conduit 120 transition to two tapered opposing inner surfaces 130A and 130B in the mixing zone 126 that are frustal in shape. These tapered inner surfaces 130A and 130B serve to gradually reduce the inside cross sectional area of the primary conduit 120 along a length 135 of the mixing zone 126. Part of the primary conduit outlet 132 is a rectangular shaped lip 128 that is preferably razor sharp for shearing the liquid into rods. The complete nozzle assembly can be mounted for example through a header 134 or flange wall (not shown).

Figure 5:
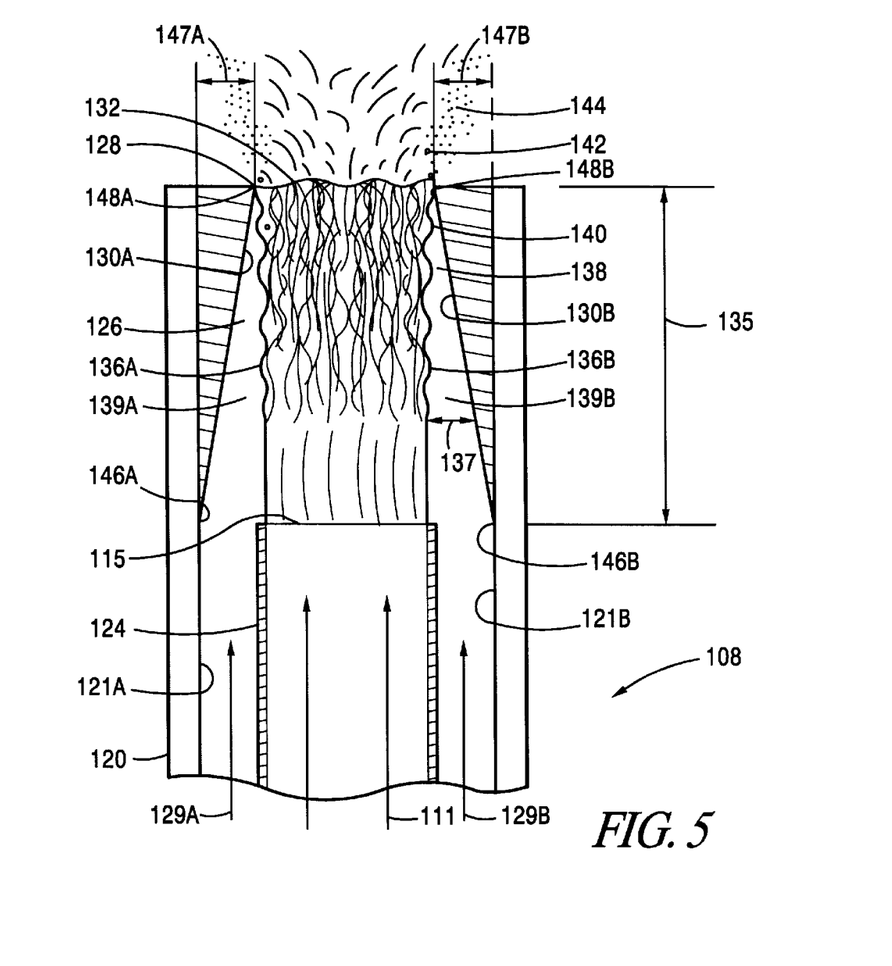
FIG. 5 shows the outlet of the nozzle of FIG. 4 in greater detail.

FIG. 5 shows an enlargement of the upper section of the nozzle 108 in FIG. 4, including the mixing zone 126 and the primary conduit outlet 132, to show the fluid mechanical process by which the liquid streams 129A and 129B are atomized. Over the length 135 of the mixing zone 126, the tapered inner surfaces of the primary conduit serve to gradually reduce the thickness 137 of each liquid stream to form two thin liquid films 139A and 139B. As the liquid films 139A and 139B continue to travel along the tapered inner surfaces 130A and 130B, ripples along the dispersion medium-liquid interfaces 136A and 136B are formed that lead to alternating thicker bands 138 and thinner bands 140 of liquid film. The rippling of the dispersion medium-liquid interfaces 136A and 136B is produced by designing the nozzle so that the velocity of the dispersion medium 111 exceeds the velocity of the liquid streams 129A and 129B at the secondary conduit outlet 115. As the liquid films 139A and 139B pass through the primary conduit outlet 132, the lip 128 cuts or shears the liquid films 139A and 139B at the thinner bands 140 to form cylindrically shaped rods 142. The rods 142 are discharged from the primary conduit outlet 132 with the dispersion medium stream 111 in between. The dispersion medium as it expands in turn breaks or shatters the rods 142 into liquid droplets 144.

Figure 5A:
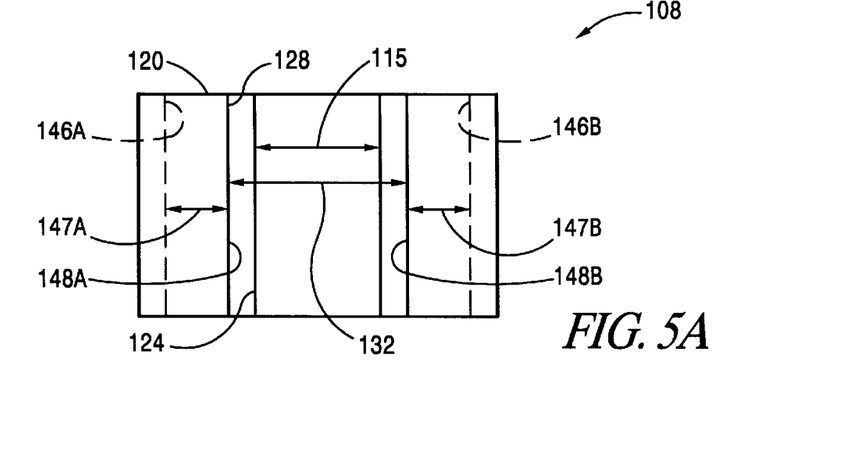
FIG. 5A shows a top view of the nozzle in FIG. 4.

FIG. 5A shows a top view of the upper section of the nozzle in FIG. 5. In FIG. 5A, the secondary conduit outlet 115 is concentrically aligned with the primary conduit outlet 132. The secondary conduit outlet is located within the primary conduit at a distance from the primary conduit outlet equal to the length of the mixing zone. FIG. 5A also shows that the cross-sectional area of the primary conduit decreases over the length of the mixing zone by widths 147A and 147B which are located between the primary conduit inner surfaces 146A and 146B at the secondary conduit outlet 115, and the primary conduit inner surfaces 148A and 148B at the primary conduit outlet 132 respectively. The lip 128 corresponds to the inner surfaces 148A and 148B at the primary conduit outlet 132.

Although not intending to be limited by theory, it is believed that the nozzle of the present invention is capable of producing a relatively wide spray of fine liquid droplets with low pressure drop through the following features. One feature of the nozzle is that the liquid stream and dispersion medium are combined just before the nozzle outlet in the mixing zone. By delaying the joining of the streams, less energy is needed to direct the liquid stream through the nozzle. Another feature of the nozzle is that when the streams are joined in the mixing zone, the liquid is forced into a thin film due to both the tapered inner surface of the mixing zone and the expansion of the dispersion medium. Directing a thin liquid film through the nozzle outlet consumes less pressure drop than directing liquid in other possible forms, such as liquid uniformly mixed in a dispersion gas through the nozzle outlet. Additionally, the nozzle of the present invention does not need the liquid stream or the dispersion medium stream to be forced through a minute flow restriction, and thereby avoids higher pressure drop and increased risk of fouling or plugging.

In addition to these features, the tapered inner surface and length of the mixing zone are preferably designed to produce acoustic resonance which indicates that the liquid stream-dispersion medium interface oscillates to produce not only a liquid film having alternating regions of greater and lesser thickness but also a dispersion medium having alternating regions of high and low density. The interaction of local density gradients in the dispersion medium with the individual liquid structures continues the liquid breakup process beyond the atomizing lip. In the case of a cylindrical conduit, circular hoops are produced and in the case of rectangular conduits, straight rods are produced. These discrete liquid elements are then further shattered to form liquid droplets through the continued local expansion of the dispersion medium.

As one skilled in the art would recognize the design of the nozzle including the cross-sectional area and length of the primary conduit and secondary conduit, the mixing zone length, the degree of taper in the mixing zone, and dimensions of the lip depend on the properties of the liquid stream and dispersion medium, the mass flow rates of the liquid stream and dispersion medium, the available feed-side pressure drop and dispersion medium pressure drop, and the target liquid droplet size. The following design features are preferred.

With respect to the primary and secondary conduits, at least a portion of the secondary conduit outlet is located within the primary conduit to form a mixing zone having a length equal to the distance between the secondary conduit outlet and primary conduit outlet. Also, the passageway formed between the secondary conduit outer surface and the primary conduit inner surface is long enough to provide a fully developed flow of liquid to the mixing zone. Preferably the passageway is at least 10 times, more preferably at least 20 times, and most preferably at least 25 times the diameter of the passageway, where the diameter of the passageway is the distance between the inner surface of the primary conduit and outer surface of the secondary conduit. Preferably, the longitudinal axis of the secondary conduit is concentrically aligned with the longitudinal axis of the primary conduit.

As is evident from FIGS. 2 and 4, the primary and secondary conduits may include one or more sections that are joined together. For example, the primary conduit may be composed of a cylindrical tube and a frustoconically shaped segment inserted within the cylindrical tube to form the tapered inner surface in the mixing zone between the secondary conduit and primary conduit outlets. Also, for example, the secondary conduit may be composed of several sections. In a preferred embodiment as shown in FIGS. 2 and 4, the secondary conduit contains an expansion union upstream of the secondary outlet to increase the cross-sectional area of the secondary conduit. Maintaining the passageway between the principal conduit and secondary conduit constant until reaching the expansion union in the secondary conduit serves to maximize the feed-side flow area over most of the nozzle length. The reduction in the cross-sectional area of the passageway between the principal conduit and secondary conduit just prior to the mixing zone allows pressure recovery within the feed-side conduit so that the net liquid pressure drop excluding the mixing zone is negligible. The sizing of the expansion union and length of the expanded cross-sectional area is selected to provide fully developed flow in both the liquid stream and dispersion medium entering the mixing zone.

The ratio of the cross-sectional area of the primary conduit outlet to the cross sectional area of the secondary conduit outlet is chosen to enhance the acoustic resonance in the mixing zone. The optimal ratio of these cross-sections depends on the flow rates and properties of the liquid stream and dispersion medium. Preferably, the ratio of the cross sectional area of the passageway to the cross sectional area of the secondary conduit at the beginning of the mixing zone is from about 0.05:1 to about 20:1, and more preferably from about 0.2:1 to about 2:1.

Acoustic resonance in the mixing zone can be further enhanced through the selection of length of the mixing zone and degree of taper of the tapered inner surface. Preferably, the length of the mixing zone between the secondary conduit outlet and primary conduit outlet is from about 0.3 to 6, and more preferably from about 0.5 to 3 times the inside diameter of the primary conduit at the beginning of the mixing zone (i.e., at the axial location of the secondary conduit outlet). Where the primary conduit is irregularly shaped, the shortest diameter is used to determine the length of the mixing zone. The degree of taper of the inside surface of the primary conduit in the mixing zone depends on the shape of conduit selected. However, generally, the degree of taper of the inner surface of the primary conduit will preferably be from about 1 degree to about 45 degrees, and more preferably from about 2 degrees to about 30 degrees as measured between the tapered inner surface and the inner surface of the primary conduit prior to the taper (e.g., angle θ in FIG. 3).

As would be evident to one skilled in the art the shape of the tapered inner surface is chosen to complement the cross-sectional geometries of the primary and secondary conduits. For example, in the case of a cylindrically shaped primary conduit, the tapered inner surface is preferably a frustal conic shaped surface. In the case of a rectangularly shaped primary conduit, the tapered inner surface preferably comprises at least two opposing frustal shaped planes.

Preferably, the primary conduit outlet has a lip that is used to enhance shearing or slicing of the liquid film as it exits the primary conduit outlet. Preferably, the lip is sharp and more preferably razor sharp, that is, machined to the most geometrically perfect point achievable. The lip is preferably flush with the inner surface of the primary conduit at the outlet.

In the process of the present invention, a liquid stream is directed through the principal conduit inlet and a dispersion medium is fed through the secondary conduit inlet of the nozzle of the present invention. The liquid stream and dispersion medium are combined in the mixing zone to form a prefilmed liquid stream. The prefilmed liquid stream is directed through the mixing zone and across the primary conduit outlet lip to form an atomized liquid of fine droplets. As described in the design of the nozzle, the liquid stream in the mixing zone is formed into a thin liquid film due to both the tapered inner surface in the mixing zone and the expansion of the dispersion medium. Preferably, the thickness of liquid film in the mixing zone is less than about 1 inch and more preferably less than about ½ inch.

The proportion of dispersion medium to the liquid stream exiting the nozzle is adjusted to provide adequate atomization of the liquid stream. The amount of dispersion medium based on the total weight of liquid stream exiting the nozzle is preferably from about 0.5 weight percent to about 5.0 weight percent, and more preferably from about 1.0 weight percent to about 3.5 weight percent. In order to achieve acoustic resonance in the mixing zone, the velocity of the liquid stream relative to the velocity of dispersion medium is adjusted. As one skilled in the art would recognize, the velocities at a given mass flow rate are adjusted through altering the cross-sectional areas of the primary and secondary conduits. Preferably, the primary conduit and secondary conduit are sized to provide a velocity of the liquid stream at the beginning of the mixing zone that is at least 1 foot per second (f/s). The optimal velocity of the dispersion medium will in general be much larger, but the preferred velocity is strongly dependent on fluid properties.

The liquid stream useful in the process of the present invention is any stream containing a liquid that is to be atomized. The liquid stream may also optionally contain additives such as surfactants to enhance atomization. Preferably, the liquid stream contains at least 80 weight percent, and more preferably at least 90 percent liquid.

In a preferred embodiment of the process of the present invention, the liquid stream is a hydrocarbon feed that is to be catalytically cracked. The hydrocarbon feed may be any of the feedstocks commonly processed in a commercial fluid catalytic cracking unit. Preferably the hydrocarbon feed to be employed boils at a temperature of at least 400° F. and more preferably from about 400° F. to about 1000° F. Such hydrocarbon feeds include for example virgin gas oils, cycle gas oils, reduced crudes and residuals.

The dispersion medium may be any gas-containing stream that is effective at dispersing the liquid stream. Preferably, the dispersion medium contains at least 75 weight percent and more preferably from about 90 weight percent to 100 weight percent gas based on the total weight of the dispersion medium. The dispersion medium may be for example steam, air, fuel gas, butane, naphtha, other gaseous hydrocarbons, nitrogen, or inert gases such as argon, or helium, or combinations thereof. Preferably, the dispersion medium is steam.

The nozzle of the present invention may be used in any application where it is desired to atomize a liquid. For example, the nozzle of the present invention may be used to inject liquid reactants into various types of reaction vessels, disperse a liquid additive over a large area (such as a defoaming chemical on a foam layer), spray cooling liquid into a gas phase, or atomize water for firefighting purposes. In a preferred embodiment of the present invention, the nozzle is used to atomize a hydrocarbon feed into a fluid catalytic cracking unit. Preferably the nozzle of the present invention is used to spray hydrocarbon feed into the catalytic conversion zone of a riser or into a dense fluid bed reactor. Most preferably, the nozzles are used to spray hydrocarbon feed into a riser.

To obtain full coverage in the region desired to receive the atomized liquid stream, the nozzle of the present invention may be mounted in any orientation. For example, the nozzle may be mounted axially upward or downward, or radially inward or outward from a central plenum. It may also be desirable to alter the geometric shape of the nozzle, in particular, the atomizing lip, to alter the shape of the spray. For example, it may be desirable to use a cylindrically shaped nozzle to obtain a circular spray, or rectangular shaped nozzle to obtain a flat fan spray. Additionally, multiple nozzle orientations may be combined. For example several nozzles mounted axially may be used with several nozzles mounted radially to obtain full coverage in a region. However, as one skilled in the art will recognize, the number of nozzles used and their orientation will depend upon the application.

In an FCC process, generally the number, orientation, and geometric shape of the nozzles of the present invention is selected to atomize hydrocarbon feed into the catalytic conversion zone so that the cracking catalyst is thoroughly and uniformly contacted with the atomized hydrocarbon feed. Full coverage of the catalytic cracking zone enhances contacting of the catalyst with the hydrocarbon feed. The preferred orientation and number of nozzles for obtaining full coverage of the catalytic cracking zone depends on the geometric shape of the nozzle. For example, if it is desired to mount the nozzle axially, preferably a cylindrically shaped nozzle, such as the nozzle shown in FIG. 2, is used to spray upward into the catalytic cracking zone. A cylindrical nozzle is preferred in axial applications because it produces a circular spray that is well suited to uniformly cover the cross sectional area of the catalytic cracking zone. Additionally, in axial orientations, it is preferred to use a set of several parallel nozzles that are preferably mounted so that the nozzle outlets are located in a region of uniform catalyst upflow. The most preferred axial configuration in an FCC process is seven nozzles where six of the nozzles are positioned at the vertices of a hexagon ("perimeter nozzles")

and one nozzle is positioned at the center point of the hexagon ("central nozzles"). Preferably the positioning of the perimeter nozzles relative to the walls containing the catalytic cracking zone is so that the radial distance between any perimeter nozzle and the wall is approximately half the radial distance between any perimeter nozzle and the central nozzle. This arrangement assures maximum coverage of the cross-sectional area of the catalytic cracking zone.

If it is desired to mount the nozzles radially, a cylindrically shaped nozzle, as shown in FIG. 2, may be used if round sprays are desired, or a rectangular shaped nozzle, as that shown in FIG. 4, may be used if a flat spray is desired. In using either type of geometrically shaped nozzle, it is preferred to use more than one nozzle to insure complete coverage of the full cross sectional area of the catalytic cracking zone. The number of nozzles is preferably maximized up to the spatial constraints dictated by connections on the outside of the riser. The nozzles in a radial orientation are preferably distributed at equal angular intervals around the periphery of the catalytic cracking zone. Also, it is preferable that the nozzle outlets be mounted flush or almost flush with the inner wall of the riser such that disturbance to the upflowing catalyst is minimized.

As an alternative to installing only radial or only axial mounted nozzles in an FCC process, it may be desired to use a combination of axial and radial nozzles to obtain full coverage across a catalytic cracking zone. In such a situation it is preferred to select cylindrically shaped nozzles for axial mounting and either cylindrically or rectangularly shaped nozzles for radial mounting. Other useful orientations of nozzles in an FCC process are described in U.S. Pat. No. 4,640,463 which is hereby incorporated by reference in its entirety.

Although the present invention has been described above with respect to particular preferred embodiments, it will be apparent to those skilled in the art that numerous modifications and variations can be made to those designs. The descriptions provided are for illustrative purposes and are not intended to limit the invention.

What is claimed is:

1. A nozzle for atomizing a liquid comprising:

(a) a primary conduit having a longitudinal axis, an inner surface, an inlet for receiving a liquid stream, and an outlet;

(b) a secondary conduit, a portion of which is positioned within the primary conduit for receiving a dispersion medium, having a longitudinal axis, an outer surface, an inlet, and an outlet that is located within the primary conduit at a point upstream from the outlet of the primary conduit, the secondary conduit including an expansion union between the inlet and outlet of the secondary conduit to increase the cross section area of the secondary conduit within the primary conduit;

(c) at least one fluid passageway between the outer surface of the secondary conduit and the inner surface of the primary conduit; and (d) a mixing zone, located between the secondary conduit outlet and the primary conduit outlet, wherein the inner surface of the primary conduit within the mixing zone is a tapered surface that reduces the cross sectional area of the primary conduit in the mixing zone to form a liquid film therein which is atomized as it exits the primary conduit outlet.

2. The nozzle of claim 1 wherein the longitudinal axis of the primary conduit is coaligned with the longitudinal axis of the secondary conduit.

3. The nozzle of claim 1 wherein the outlet of the primary conduit further comprises a lip that is sharp for shearing the liquid stream.

4. The nozzle of claim 1 wherein the ratio of the cross-sectional area of the passageway to the cross-sectional area of the secondary conduit at the inlet to the mixing zone is from about 0.05:1 to about 20:1.

5. The nozzle of claim 1 wherein an angle $\theta$ between the tapered surface of the primary conduit within the mixing zone and the inner surface of the primary conduit prior to mixing zone is from about 1 degree to about 45 degrees.

6. The nozzle of claim 1 wherein the length of the mixing zone is from about 0.3 to about 6 times the inside diameter of the primary conduit at the beginning of the mixing zone.

7. The nozzle of claim 1 wherein the primary conduit and secondary conduit comprise two cylindrically shaped tubes.

8. The nozzle of claim 7 wherein the tapered surface is a frustal conic surface.

9. The nozzle of claim 1 wherein the primary and secondary conduits comprise rectangular shaped ducts.

10. The nozzle of claim 9 wherein the tapered surface comprises two opposing frustal planes.

* * * * *